United States Patent [19]
Ghelardoni et al.

[11] 3,898,278
[45] Aug. 5, 1975

[54] SUBSTITUTED N-PHENYLBENZAMIDES

[75] Inventors: Mario Ghelardoni; Vittorio Pestellini; Nicola Pisanti, all of Florence; Giovanna Volterra, Sesto Fiorentino, all of Italy

[73] Assignee: A. Menarini S.A.S., Italy

[22] Filed: Apr. 2, 1973

[21] Appl. No.: 347,336

[52] U.S. Cl............................ 260/559 S; 424/230
[51] Int. Cl........................................ C07c 103/38
[58] Field of Search................................... 260/559

[56] References Cited
UNITED STATES PATENTS
3,703,552  11/1972  Spacht.............................. 260/559

*Primary Examiner*—Harry I. Moatz
*Attorney, Agent, or Firm*—McGlew and Tuttle

[57] ABSTRACT

This invention relates to substituted N-phenylbenzamides having interesting physiological activities, in particular spasmolytic, coronary dilating, analgesic, antiphlogistic and antipyretic activities. In particular, the compounds in accordance with the invention are 2-substituted-N-(4-substituted phenyl)-benzamides. The 4-substituted phenyl groups include amino group-containing substituents and quaternary salts thereof. Processes for the preparation of the compounds are described. The compounds can be administered in the form of pharmaceutical compositions.

7 Claims, No Drawings

SUBSTITUTED N-PHENYLBENZAMIDES

This invention relates to derivatives of N-phenylbenzamide having interesting physiological activities, in particular spasmolytic, coronary dilating, analgesic, antiphlogistic and antipyretic activities.

According to the present invention there is provided compounds of formula

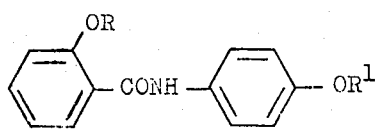   I

[wherein R represents a hydrogen atom, an alkyl group containing from 1 to 8 carbon atoms or an aralkyl group, and $R^1$ represents a hydrogen atom, or a group of formula $(R_1)_2N(CH_2)_2-$ (wherein $R_1$ represents a methyl or an ethyl group)] and quaternary methyl ammonium salts thereof when $R^1$ represents a group of formula $(R_1)_2N(CH_2)_2-$.

Compounds of formula I wherein $R^1$ represents a group of formula $(R_1)_2N(CH_2)_2-$ also conform to the formula:

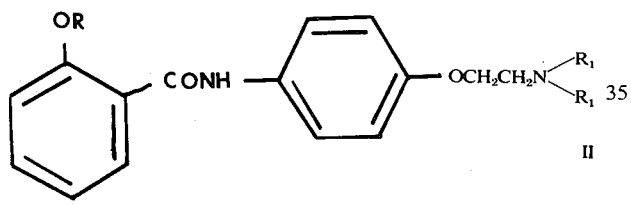   II wherein R and $R_1$ are as hereinbefore defined.

Quaternary methyl ammonium salt of the compounds of formula II in accordance with the invention can be represented by the formula:

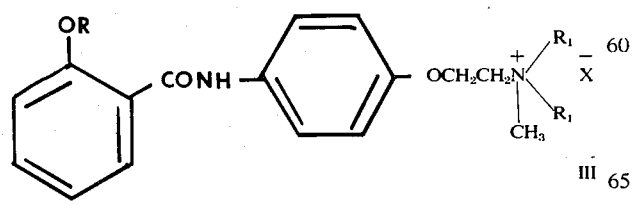   III wherein R and $R_1$ are as hereinbefore defined and X represents an anion, for example a chloride, bromide, iodide or sulphate ion.

A further group of compounds in accordance with the invention are compounds of formula

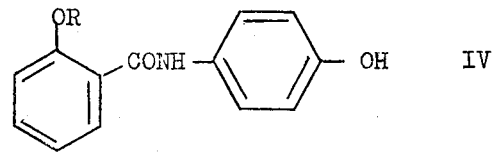   IV wherein R is as hereinbefore defined.

Preferred compounds of formula I by virtue of their valuable physiological activities include those compounds wherein R represents a hydrogen atom or a methyl, ethyl, n-propyl, n-butyl, n-amyl, n-heptyl, n-octyl, benzyl, 2-phenylethyl or 3-phenylpropyl group.

Examples of compounds of formula I wherein $R^1$ represents a group of formula $(R_1)_2N(CH_2)_2$-include:

1. 2-hydroxy-N-[4-(2-diethylaminoethoxy)-phenyl]-benzamide. (Formula II:- R = H, $R_1$ = $C_2H_5$; m.p. 108° to 110°C).
2. 2-methoxy-N-[4-(2-diethylaminoethoxy)-phenyl]-benzamide (Formula II: - R = $CH_3$, $R_1$ = $C_2H_5$; hydrochloride m.p. 132° to 133°C).
3. 2-ethoxy-N-[4-(2-dimethylaminoethoxy)-phenyl]-benzamide. (Formula II: - R = $C_2H_5$, $R_1$ = $CH_3$; m.p. 72° to 74°C).
4. 2-ethoxy-N-[4-(2-diethylaminoethoxy)-phenyl]-benzamide. (Formula II: - R = $C_2H_5$, $R_1$ = $C_2H_5$; m.p. 48° to 49°C).
5. 2-n-propoxy-N-[4-(2-diethylaminoethoxy)-phenyl]-benzamide. (Formula II: R = n-$C_3H_7$, $R_1$ = $C_2H_5$; m.p. 63° to 65°C).
6. 2-n-butoxy-N-[4-(2-diethylaminoethoxy)-phenyl]-benzamide (Formula II:- R = n-$C_4H_9$, $R_1$ = $C_2H_5$; m.p. 74° to 76°C).
7. 2-n-amyloxy-N-[4-(2-diethylaminoethoxy)-phenyl]-benzamide. (Formula II:- R = n-$C_5H_{11}$, $R_1$ = $C_2H_5$; m.p. 54° to 56°C).
8. 2-n-heptyloxy-N-[4-(2-diethylaminoethoxy)-phenyl]-benzamide. (Formula II:- R = n-$C_7H_{15}$, $R_1$ = $C_2H_5$: m.p. 44° to 46°C).
9. 2-n-octyloxy-N-[4-(2-diethylaminoethoxy)-phenyl]-benzamide. (Formula II:- R = n-$C_8H_{17}$, $R_1$ = $C_2H_5$; m.p. 56° to 58°C).
10. 2-benzyloxy-N-[4-(2-diethylaminoethoxy)-phenyl]-benzamide (Formula II: R = $C_6H_5CH_2$, $R_1$ = $C_2H_5$; m.p. 66° to 68°C).
11. 2-(2-phenylethoxy)-N-[4-(2-diethylaminoethoxy)phenyl] benzamide. (Formula II:- R = $C_6H_5CH_2CH_2$, $R_1$ = $C_2H_5$; m.p. 98° to 100°C).

12. 2-(3-phenylpropoxy)-N-[4-(2-diethylaminoethoxy)phenyl]benzamide. (Formula II:- R = $C_6H_5CH_2CH_2CH_2$, $R_1$ = $C_2H_5$; m.p. 58° to 60°C).

Examples of quaternary methyl ammonium salts in accordance with the present invention include:-

13. N-methyl-N,N-diethyl-N-{2-[4-(2-hydroxybenzamide) phenoxy]ethyl} ammonium bromide (Formula III:- R = H, $R_1$ = $C_2H_5$, X = Br; m.p. 198° to 200°C).

14. N-methyl-N,N-diethyl-N-{2-[4-(2-methoxybenzamide) phenoxy]ethyl} ammonium bromide (Formula II:- R = $CH_3$, $R_1$ = $C_2H_5$, X = Br; m.p. 149° to 151°C).

15. N,N,N-trimethyl-N-{2-[4-(2-ethoxybenzamido)-phenoxy]ethyl} ammonium bromide (Formula III:- R = $C_2H_5$, $R_1$ = $CH_3$, X = Br; m.p. 217° to 219°C).

16. N-methyl-N,N-diethyl-N-{2-[4-(2-ethoxybenzamido)phenoxy]ethyl}ammonium bromide. (Formula III:- R = $C_2H_5$, $R_1$ = $C_2H_5$, X = Br; m.p. 148° to 149°C).

17. N-methyl-N,N-diethyl-N-{2-[4-(2-n-propoxybenzamido)phenoxy]ethyl} ammonium bromide (Formula III:- R = n-$C_3H_7$, $R_1$ = $C_2H_5$, X = Br; m.p. 132° to 133°C).

18. N-methyl-N,N-diethyl-N-{2-[4-(2-n-butoxybenzamido)phenoxy]ethyl} ammonium bromide (Formula III:- R = n-$C_4H_9$, $R_1$ = $C_2H_5$, X = Br; m.p. 121° to 123°C).

19. N-methyl-N,N-diethyl-N-{2-[4-(2-n-amyloxybenzamido)phenoxy]ethyl} ammonium bromide (Formula III:- R = n-$C_5H_{11}$, $R_1$ = $C_2H_5$, X = Br; m.p. 146° to 147°C).

20. N-methyl-N,N-diethyl-N-{2-[4-(2-n-heptyloxybenzamido)phenoxy]ethyl} ammonium bromide. (Formula III:- R = n-$C_7H_{15}$, $R_1$ = $C_2H_5$, X = Br; m.p. 124° to 125°C).

21. N-methyl-N,N-diethyl-N-{2-[4-(2-n-octyloxybenzamido)phenoxy]ethyl} ammonium bromide. (Formula III:- R = n-$C_8H_{17}$, $R_1$ = $C_2H_5$, X = Br; m.p. 133° to 135°C).

22. N-methyl-N,N-diethyl-N-{2-[4-(2-benzyloxybenzamido)phenoxy]ethyl} ammonium bromide (Formula III:- R = $C_6H_5CH_2$, $R_1$ = $C_2H_5$, X = Br; m.p. 161° to 162°C).

23. N-methyl-N,N-diethyl-N-{2-[4-(2-(2-phenylethoxy)benzamido)phenoxy]ethyl} ammonium bromide. (Formula III:- R = $C_6H_5CH_2CH_2$, $R_1$ = $C_2H_5$, X = Br; m.p. 147° to 150°C).

24. N-methyl-N,N-diethyl-N-{2-[4-(2-(3-phenylpropoxy)benzamido)phenoxy]ethyl} ammonium bromide. (Formula III:- R = $C_6H_5CH_2CH_2CH_2$, $R_1$ = $C_2H_5$, X = Br; m.p. 137° to 140°C).

Examples of compounds of formula IV include:-

25. 2-methoxy-N-(4-hydroxyphenyl)benzamide (Formula IV: R = $CH_3$; m.p. 169° to 170°C).

26. 2-ethoxy-N-(4-hydroxyphenyl)benzamide (Formula IV: R = $C_2H_5$; m.p. 161° to 163°C).

27. 2-n-propoxy-N-(4-hydroxyphenyl)benzamide (Formula IV: R = n-$C_3H_7$; m.p. 144° to 145°C).

28. 2-n-butoxy-N-(4-hydroxyphenyl)benzamide (Formula IV: R = n-$C_4H_9$; m.p. 146° to 148°C).

29. 2-n-amyloxy-N-(4-hydroxyphenyl)benzamide (Formula IV: R = n-$C_5H_{11}$; m.p. 129° to 131°C).

30. 2-n-heptyloxy-N-(4-hydroxyphenyl)benzamide (Formula IV:- R = n-$C_7H_{15}$; m.p. 98° to 100°C)

31. 2-n-octyloxy-N-(4-hydroxyphenyl)benzamide (Formula IV:- R = n-$C_8H_{17}$; m.p. 104° to 106°C)

32. 2-benzyloxy-N-(4-hydroxyphenyl)benzamide (Formula IV:- R = $C_6H_5CH_2$; m.p. 174° to 176°C).

33. 2-(2-phenylethoxy)-N-(4-hydroxyphenyl)benzamide (Formula IV:- R = $C_6H_5CH_2CH_2$; m.p. 156° to 158°C)

34. 2-(3-phenylpropoxy)-N-(4-hydroxyphenyl)benzamide Formula IV:- R = $C_6H_5CH_2CH_2CH_2$; m.p. 124° to 126°C)

The above specifically-mentioned compounds have particularly interesting physiological activities. In particular the compounds of formulae II and III have shown spasmolytic activity and coronary dilating properties. In the compounds wherein R is an alkyl group, spasmolytic activity (the capacity to antagonize barium chloride — induced spasm) generally depends on the length of the alkyl chain. The compounds of formula IV have shown interesting analgesic, antiphlogistic and antipyretic activities.

The compounds of formula II can be prepared by reacting an appropriately substituted benzoyl halide, ester or anhydride with 4-(2-diethylaminoethoxy)aniline or with 4-(2-dimethylaminoethoxy)aniline; by etherification of an appropriately substituted N-(4-hydroxyphenyl)benzamide of formula IV with a 2-diethylaminoethyl halide or a 2-dimethylaminoethyl halide; or by reaction of an appropriately substituted 2-[4-(2-alkyloxy-or aralkyoxybenzamido)phenoxy] ethyl halide with diethylamine or dimethylamine.

The compounds of formula III can be prepared by quaternizing the corresponding compounds of formula II, for example with methyl chloride, bromide or iodide, or with dimethyl sulphate.

The compounds of formula IV can be prepared by acylation of 4-aminophenol with an appropriately substituted benzoyl halide, ester or anhydride.

The present invention further provides pharmaceutical compositions comprising as active ingredient at least one compound of formula I (as hereinbefore defined), in association with a pharmaceutical carrier or excipient.

Compositions in accordance with the present invention may be presented in a form suitable for oral, rectal or parenteral administration. They may, for example, be presented in the form of tablets, pills, coated tablets, capsules, lozenges, pessaries, suspensions, or wettable powders. Conventional pharmaceutical carriers and excipients can be used. The compositions are preferably presented in dosage unit form, advantageously containing from 5 to 30 mg. of compounds of formulae II or III, or from 100 to 600 mg. of a compound of formula IV as active ingredient. The adult daily dose is preferably from 100 to 300 mg. of a compound of formulae II or III, or from 500 to 2000 mg. of a compound of formula IV.

The following Examples are given by way of illustration only and they illustrate the preparation of compounds 4 and 26. Other compounds in accordance with the invention have been prepared analogously and the melting points of the products obtained are given above for compounds 1 to 34.

EXAMPLE 1

Preparation of 2-ethoxy-N-(4-hydroxyphenyl)benzamide (compound 26).

18.4 g. of 2-ethyoxybenzoyl chloride were slowly added dropwise, with stirring, to a solution of 7.9 g. of anhydrous pyridine and 10.9 g. of 4-aminophenol in 500ml. of anhydrous dioxan.

After completing the addition, the mixture was heated on a water-bath for 90 minutes. After cooling, the reaction mixture was poured into dilute hydrochloric acid. The precipitate which separated was filtered off, washed with water, and treated with 5% sodium hydroxide. The filtrate was acidified with dilute hydrochloric acid and the precipitate obtained was crystalized from ethanol. It had a melting point of 161° to 163°C.

EXAMPLE 2

Preparation of 2-ethyoxy-N-[4-(2-diethylaminoethoxy)]-benzamide-(compound 4).

25.7 g. of 2-ethoxy-N-(4-hydroxyphenyl)benzamide (compound 26) were added to a solution of 4 g. of sodium hydroxide in 100 ml. of ethanol. The mixture was heated under reflux for one hour. After cooling, 14.5 g. of 2-diethylaminoethyl chloride were added. The mixture was refluxed for 6 hours and the solvent was removed by distillation under reduced pressure. The residue was worked up using water. The precipitate obtained was filtered off, dried, and crystallized from hexane. It had a melting point of 48° to 49°C.

EXAMPLE 3

18.4g. of 2-ethoxybenzoyl chloride were added dropwise, slowly, with stirring to 20.8 g. of 4-(2-diethylaminoethoxy)aniline in 200 ml. of anhydrous benzene. The mixture was refluxed for 30 minutes. After cooling, the precipitate obtained was filtered off, dried and treated with 5% sodium hydroxide. The product obtained was filtered off, dried, and crystallized from hexane. It had a melting point of 48° to 49°C.

We claim:

1. A compound having the formula:

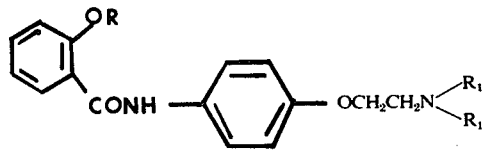

wherein R is a hydrogen atom, an alkyl group of from 1 to 8 carbon atoms, phenylalkylene of from 7 to 10 carbon atoms, $R_1$ is methyl or ethyl, and the quaternary methyl ammonium mineral acid salt thereof.

2. A compound selected from the group consisting of 2-hydroxy-N-(2-diethylaminoethoxy)-phenyl)benzamide, 2-methoxy-N-(4-(2-diethylaminoethoxy)-phenyl) benzamide, 2-ethoxy-N-(4-(2-dimethylaminoethoxy)-phenyl) benzamide, 2-ethoxy-N-(4-(2-diethylaminoethoxy)-phenyl) benzamide, 2-n-propoxy-N-(4-(2-diethylaminoethoxy)-phenyl) benzamide, 2-n-butoxy-N-(4-(2-diethylaminoethoxy)-phenyl) benzamide, 2-n-amyloxy-N-(4-(2-diethylaminoethoxy)-phenyl) benzamide, 2-n-heptyloxy-N-(4-(2-diethylaminoethoxy)-phenyl)benzamide, 2-n-octyloxy-N-(4-(2-diethylaminoethoxy)-phenyl) benzamide, 2-benzyloxy-N-(4-(2-diethylaminoethoxy)-phenyl) benzamide, 2-(2-phenylethoxy)-N-(4-(2-diethylaminoethoxy) phenyl) benzamide, and 2-(3-phenylpropoxy)-N-(4-(2-diethylaminoethoxy)phenyl)benzamide.

3. A compound selected from the group consisting of N-methyl-N, N-diethyl-N-(2-(4-(2-hydroxybenzamido)phenoxy) ethyl) ammonium bromide, N-methyl-N,N-diethyl-N-(2-(4-(2-methoxybenzamido)phenoxy)-ethyl) ammonium bromide, N,N,N-trimethyl-N-(2-(4-(2-ethoxybenzamido)phenoxy)ethyl) ammonium bromide, N-methyl-N,N-diethyl-N-(2-(4-(2-ethoxybenzamido)phenoxy)ethyl) ammonium bromide, N-methyl-N,N-diethyl-N-(2-(4-(2-n-propoxybenzamido)phenoxy)ethyl) ammonium bromide, N-methyl-N,N- diethyl-N-(2-(4- (2-n-butoxybenzamido)phenoxy)ethyl) ammonium bromide, N-methyl-N,N-diethyl-N-(2-(4-(2-n-amyloxybenzamido)phenoxy)ethyl) ammonium bromide, N-methyl-N,N-diethyl-N-(2-(4-(2-n-heptyloxybenzamido)phenoxy)-ethyl) ammonium bromide, N-methyl-N,N-diethyl-N-(2-(4-(2-n-octylocybenzamido)phenoxy)ethyl) ammonium bromide, N-methyl-N,N-diethyl-N-(2-(4-(2-benzyloxybenzamido)-phenoxy)-ethyl) ammonium bromide, N-methyl-N,N-diethyl-N-(2-(4-(2-(2-phenylethoxy) benzamido)-phenoxy)ethyl) ammonium bromide, and N-methyl-N,N-diethyl-N-(2-(4-(2-(3-phenylpropoxy)benzamido)phenoxy)ethyl) ammonium bromide.

4. A compound selected from the group consisting of 2-methoxy-N-(4-hydroxyphenyl)-benzamide, 2-ethoxy-N-(4-hydroxyphenyl) benzamide, 2-n-propoxy-N-(4-hydroxyphenyl)benzamide, 2-n-butoxy-N- (4-hydroxyphenyl)benzamide, 2-n-amyloxy-N-(4-hydroxyphenyl-benzamide, 2-n-heptyloxy-N-(4-hydroxyphenyl)benzamide, 2-n-octyloxy-N-(4-hydroxyphenyl)benzamide, 2-benzyloxy-N-(4-hydroxyphenyl)benzamide, 2-(2-phenylethoxy)-N-(4-hydroxyphenyl) benzamide, and 2-(3-phenylpropoxy)-N-(4-hydroxyphenyl)benzamide.

5. A compound having the formula:

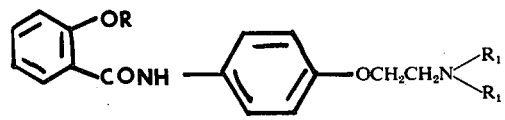

wherein R is a hydrogen atom, an alkyl group of from 1 to 8 carbon atoms, phenylalkylene of from 7 to 10 carbon atoms, and $R_1$ is methyl or ethyl.

6. A compound of the formula:

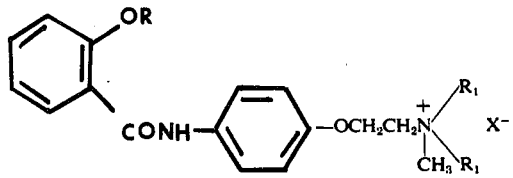

werein R is a member selected from the group consisting of hydrogen atom, an alkyl group of from 1 to 8 carbon atoms, and phenylalkylene of from 7 to 10 carbon atoms; $R_1$ is a member selected from the group consisting of methyl or ethyl; and $X^-$ is a member selected from the group consisting of chloride, bromide, iodide and sulphate.

7. Compound according to claim 1, wherein R is selected from the group consisting of benzyl, phenylethyl and phenyl-propyl groups.

* * * * *